Sept. 10, 1968 J. DANILUK 3,400,970
TILT CAB LATCH MECHANISM
Filed May 29, 1967 2 Sheets-Sheet 1
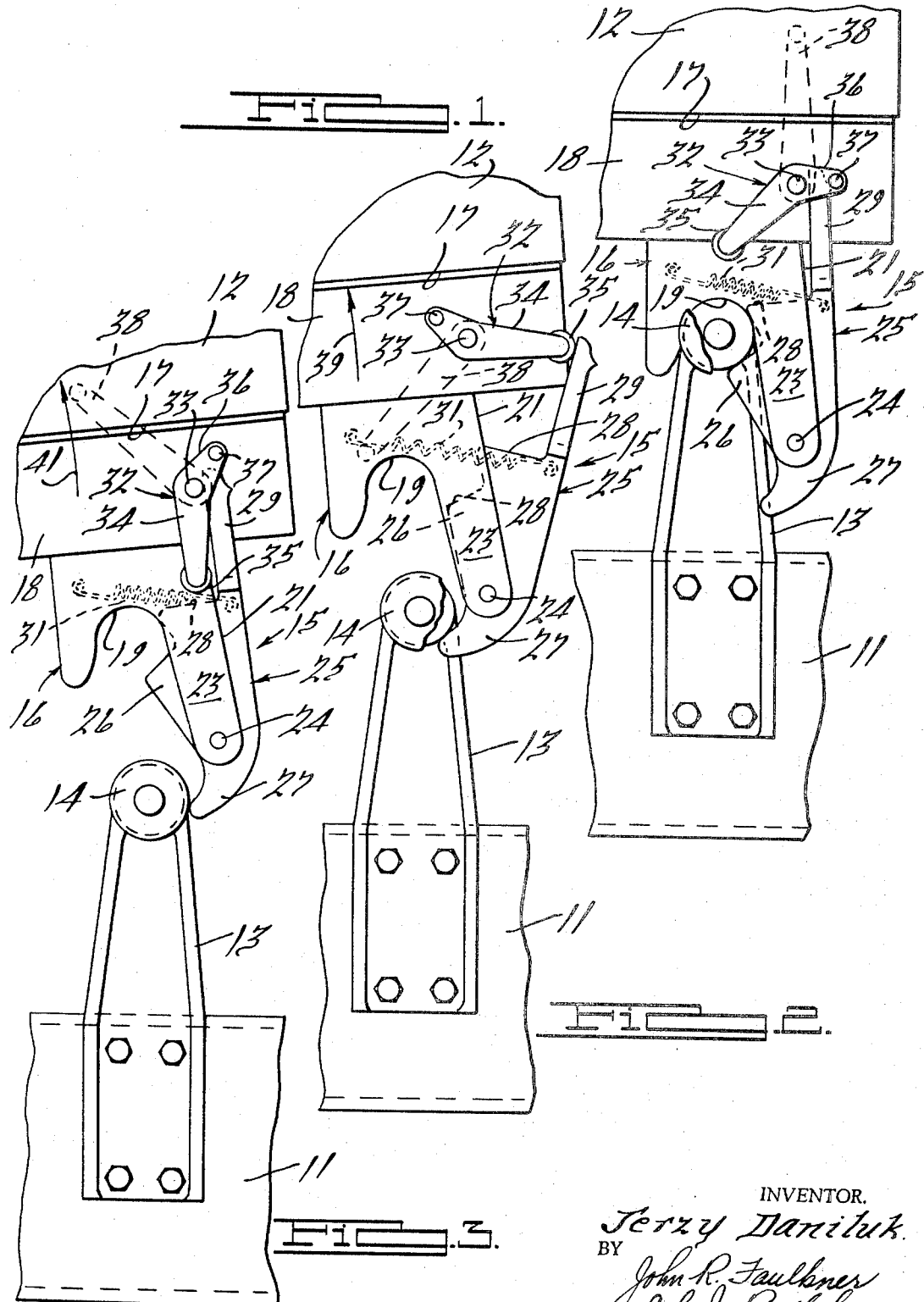
INVENTOR.
Jerzy Daniluk.
BY John R. Faulkner
John J. Roethel
ATTORNEYS

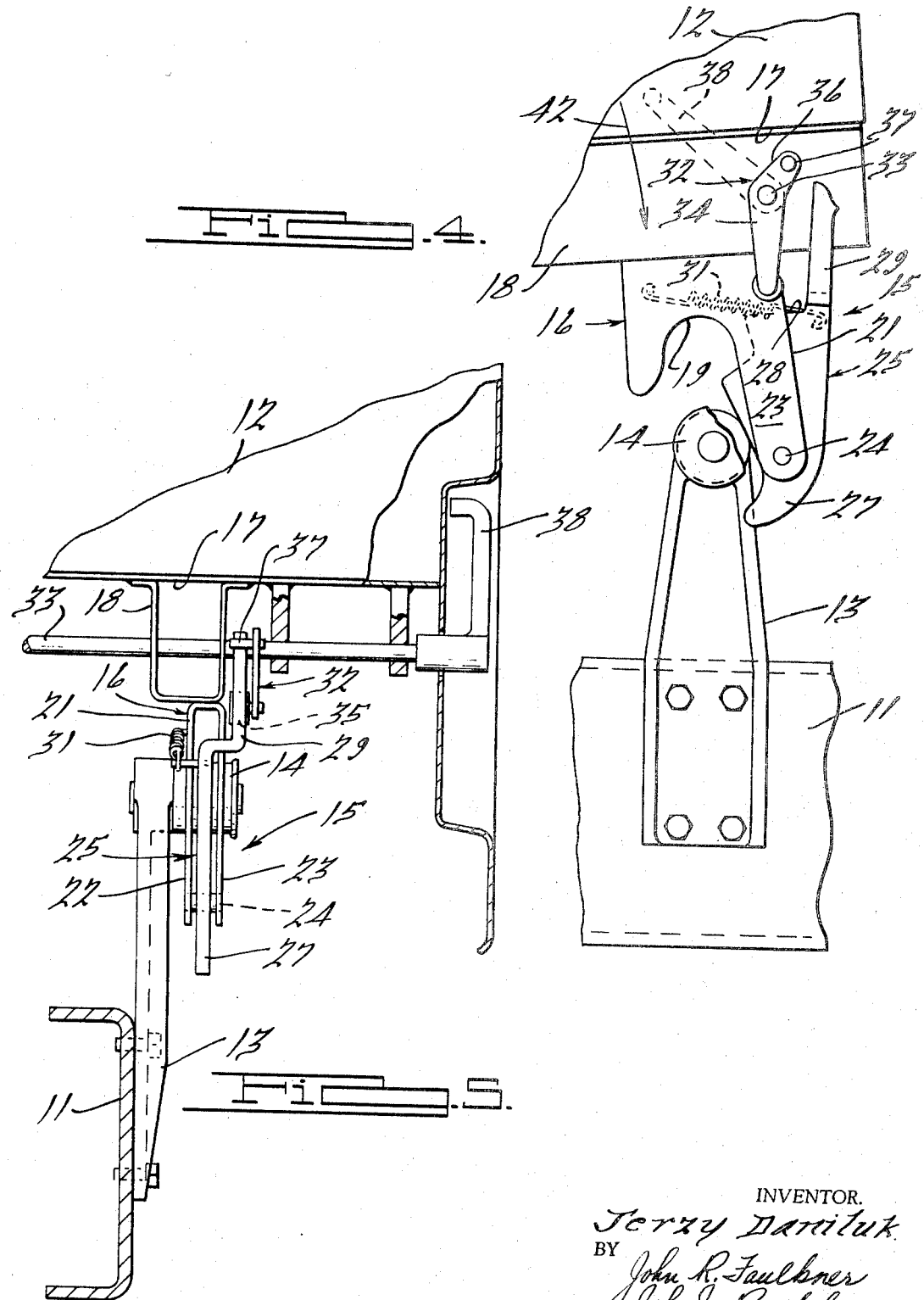

United States Patent Office 3,400,970
Patented Sept. 10, 1968

3,400,970
TILT CAB LATCH MECHANISM
Jerzy Daniluk, Taylor, Mich., assignor to Ford Motor Company, Dearborn, Mich., a corporation of Delaware
Filed May 29, 1967, Ser. No. 641,984
6 Claims. (Cl. 296—35)

ABSTRACT OF THE DISCLOSURE

A latch mechanism for latching a movable vehicle body structure, such as a truck cab mounted for tilting movement relative to a fixed body structure, such as a chassis or engine compartment frame structure. The latch mechanism coacts with a striker bar on the fixed body structure through a detent means. The detent means is movable out of latching engagement with the striker bar or is locked against such movement by a lever means responsive to an operating means.

Background of the invention

Latch mechanisms for latching truck tilt cabs to the vehicle chassis or engine compartment frame structure have become somewhat cumbersome to operate and have become somewhat complicated to manufacture because of a proliferation of parts utilized to achieve the desired function. Accordingly, it is deemed desirable to simplify the cab latch mechanisms and to reduce the number of parts involved.

Summary of the invention

The present invention embodies a latch mechanism for latching a movable vehicle body structure, such as a truck tilt cab, to a fixed body structure, such as a vehicle chassis or engine compartment frame structure. The fixed body structure has a generally horizontally extending striker bar mounted thereon.

The latch mechanism comprises a bracket extending from the body structure and having a recessed portion overlying and partially encompassing the striker bar in latched position of the movable body structure. A detent means is pivotally mounted on the bracket and has a part underlying the striker bar when in latched position of said movable body structure. A lever means is pivotally mounted on the body structure. This lever means has a first part for interlocking engagement with the detent means and a second part for abutting engagement with the detent means. The lever means is coupled to an operating means by which the lever means may be swung in one direction to place its first part in interlocking engagement with the detent means to hold the latter in latching engagement with the striker bar. Or, the lever means may be swung in a second direction to cause its second part to abut the detent means to move the latter so that its part underlying the striker bar will be moved to a position in which the movable body structure becomes unlatched from the fixed body structure.

Complete unlatching movement may be prevented by a safety hook on the detent means. This safety hook is rendered inoperative by positioning the operating means in a neutral position so that the movable body structure may be moved to its completely unlatched position.

Description of the drawing

Other objects, advantages and features of the present invention will be made more apparent as this description proceeds, reference being had to the accompanying drawings, wherein:

FIG. 1 is a fragmentary side elevation of a portion of the vehicle frame, the vehicle cab and the latch mechanism with the parts of the latter illustrated in latched and locked position;

FIG. 2 is a view in part similar to FIG. 1 illustrating the parts of the latch mechanism in an unlatched position but with the safety hook in engagement with the striker bar mounted on the vehicle chassis;

FIG. 3 is a view in part similar to FIG. 2 illustrating the parts of the latch mechanism in completely unlatched position;

FIG. 4 is a view illustrating the latch mechanism as the vehicle movable body structure is moved back into latching engagement relative to the fixed body structure; and FIG. 5 is a rear end elevation of FIG. 1.

Description of the preferred embodiment

Referring now to the drawings, there is shown a portion 11 of a vehicle frame above which is supported a movable vehicle structure, such as a truck tilt cab, a portion 12 of which is shown. The frame portion 11 has mounted thereon a support 13 carrying at its upper end a generally horizontally extending cylindrical striker bar 14.

The latch mechanism, generally designated 15, comprises a U-shaped bracket 16 secured to the underside of the cab floor 17 support channel 18. The opened end of the U-shaped bracket 16 faces downwardly. The bracket 16, as seen in side elevation, has a recess or pocket 19 and is adapted to encompass substantially the upper half of the striker bar 14 when the cab and frame elements are in the fully latched relationship as shown in FIG. 1.

As further seen in the side elevation, the bracket 16 is somewhat elongated at its rear side 21 to provide two depending legs 22 and 23. A shaft 24 extends across the space between the two depending legs 22 and 23 and has journalled thereon a detent means 25.

The detent means 25 is in the form of an elongated plate having a stepped or abutment portion 26 above its pivot axis, i.e., the shaft 24, and a hook-like extension 27 below its pivot axis. As seen in FIG. 5, the detent means 25 is journalled between the depending legs 22 and 23 of the bracket 16. The detent means has a hook-like extension 27 below its pivot axis projecting beyond the ends of the depending legs 22 and 23 of the bracket. Projecting upwardly from the upper edge 28 of the detent means is an elongated appendage 29 which is laterally offset from the plane of the plate of the detent means 25. The detent means 25 is spring loaded by a tension spring 31 anchored at one end to the bracket 16 and at its other end to the detent means just below the appendage 29. The spring 31 urges the detent means and thereby the abutment portion 26 in the direction of the recess 19 of the bracket 16.

Movement of the detent means 25 from latched to unlatched position and also restraint of the detent means against such movement is controlled by a lever means 32 carried on a shaft 33 journalled in any convenient manner on the underside of the cab structure. The lever means 32 is pivoted intermediate its ends and carries on the end of one leg 34 a roller 35. On the end of its second leg 36 it carries a pin 37.

The shaft 33 has connected to one end a handle 38. The shaft 33 and handle 38 comprise an operating means coupled to the lever means 32 for operating the latter. It may be noted here that the shaft 33 preferably extends completely across the rear of the cab 12 where it is coupled to a second latch mechanism 15 (not shown) corresponding to the latch mechanism that has been described in detail.

Operation of the preferred embodiment

Referring first to FIG. 1, the truck tilt cab 12 is shown in latched relationship to the vehicle frame 11. In this relationship, the bracket 16 recess 19 substantially encompasses the upper half of the striker bar 14. Also, in this relationship of the bracket 16 and the striker bar 14, the abutment portion 26 of the detent means 25 underlies the striker bar 14, thereby preventing upward movement of the truck tilt cab relative to the frame. The detent means is positively held in latched position by the relationship of the release lever 32 to the appendage 29 of the detent means 25. With the operating handle 38 in a substantially upwardly extending position as shown in dot dash outline in FIG. 1, the end of the appendage 29 of the detent means 25 is entrapped between the pin 37 and the shaft 33 on which the release lever 32 is mounted.

In order to release the latch mechanism 15 so that the truck tilt cab can be swung in an upward direction, i.e., the direction of the arrow 39 in FIG. 2, it is necessary to swing the operating handle 38 in a direction to cause the release lever 32 to be swung in a counterclockwise direction as viewed in FIGS. 1 to 4, inclusive. When the release lever 32 is swung in a counterclockwise direction, the roller 35 will abut the appendage 29 of the detent means 25 causing the latter to be swung in a clockwise direction about the shaft 24 thus moving the detent abutment portion 26 from beneath the cylindrical striker bar 14. The truck tilt cab may then be moved upwardly, but only for a short distance.

It will be noted that the hook portion 27 of the detent means abuts the cylindrical striker bar 14 after the cab has moved upwardly this short distance. This has two purposes. First, it ensures that the cab will not be moved to a fully tilted position without the movement being controlled by the vehicle operator. Second, it requires a return of the handle 38 to a neutral position so that the latch mechanism will be placed in condition for subsequent relatching of the tilt cab to the chassis or frame member. Only when the operating handle 38 has been moved to a position in which the release lever 32 assumes a position as shown in FIG. 3, can the upward movement of the tilt cab in the direction of the arrow 41 be continued. When the release lever is in the position shown in FIG. 3, the spring 31 restores the detent means to a position in which the detent abutment portion 26 is set to engage the striker bar 14 the next time the tilt cab is lowered to its normal latched relationship to the chassis or frame member.

FIG. 4 illustrates the relationship of the parts of the latch mechanism to the striker bar 14 as the tilt cab is moved in the direction of the arrow 43 or toward the chassis or frame member 11. The release lever 32 is in the neutral position. As the cab is lowered the detent abutment portion 26 engages the striker bar 14 so that the detent means 25 is rotated slightly in a clockwise direction until the striker bar is nestled in the recess 19 whereupon the detent abutment portion 26 under the influence of the spring 31 will snap into the latching position shown in FIG. 1.

Although not shown, it will be understood that suitable stops may be provided to indicate the position of the operating handle 38 or to limit the movement of the release lever 32 in each of its extreme directions of movement.

It will be understood that this invention is not to be limited to the exact construction shown and described but that various changes and modifications may be made without departing from the spirit and scope of the invention as defined in the appended claims.

I claim:

1. A latch mechanism for latching a movable vehicle body structure to a fixed body structure upon which is mounted a striker having a generally horizontally extending striker bar, comprising:
    a bracket extending from said body structure and having a recessed portion overlying and partially encompassing the striker bar in latched position of said movable body structure,
    detent means pivotally mounted on said bracket having a part thereof underlying said striker bar in latched position of said movable body structure,
    lever means pivotally mounted on said body structure having a first part for interlocking engagement with said detent means and a second part for abutting engagement with said detent means,
    and operating means coupled to said lever means for swinging the latter in one direction to place said first part in interlocking engagement with said detent means to hold the latter in latching engagement with said striker bar or in a second direction to cause said second part to abut said detent means to move said detent means part from beneath said striker bar thereby unlatching said movable body structure from said fixed body structure,
    said detent means having a hook extension engageable with said striker bar upon movement of the detent means part from beneath said striker bar and movement of said movable body structure a predetermined distance from said fixed body structure,
    said hook extension preventing complete unlatching movement of the movable body structure until the operating means is returned to a neutral position after movement in the second direction.

2. A latch mechanism according to claim 1, in which:
    a spring means urges said detent means toward latched position.

3. A latch mechanism according to claim 2, in which:
    the lever means first part having interlocking engagement with the detent means comprises a pair of spaced abutments,
    said detent means having an extension positionable between said abutments.

4. A latch mechanism according to claim 1, in which:
    the lever means first part having interlocking engagement with the detent means comprises a pair of spaced abutments,
    said detent means having an extension positionable between said abutments.

5. A latch mechanism for latching a movable vehicle body structure to a fixed body structure upon which is mounted a striker having a generally horizontally extending striker bar, comprising:
    a bracket extending from said body structure and having a recessed portion overlying and partially encompassing the striker bar in latched position of said movable body structure,
    detent means pivotally mounted on said bracket having a part thereof underlying said striker bar in latched position of said movable body structure,
    lever means pivotally mounted on said body structure having a first part for interlocking engagement with said detent means and a second part for abutting engagement with said detent means,
    and operating means coupled to said lever means having a neutral position, a latch mechanism latched position attained upon movement of the operating means in one direction from said neutral position, and a latch mechanism unlatched position attained upon movement of the operating means in an opposite direction from said neutral position,
    said operating means when moved in said one direction swinging said lever means to place said first part in interlocking engagement with said detent means to hold the latter in latching engagement with said striker bar,
    said operating means when moved in said second direction causing said second part of said lever means to abut said detent means to move said detent means part from beneath said striker bar thereby unlatching said movable body structure from said fixed body structure, said detent means having a hook extension engageable with said striker bar upon movement of the detent means part from beneath said striker bar and movement of said movable body structure a predetermined distance from said fixed body structure, said hook extension preventing complete unlatching movement of the movable body structure until the operating means is returned to the neutral position after movement in the second direction.

6. A latch mechanism according to claim 5, in which: a spring means urges said detent means toward latched position.

References Cited

UNITED STATES PATENTS

| | | | |
|---|---|---|---|
| 1,879,792 | 9/1932 | Cheney | 292—126 X |
| 2,028,954 | 1/1936 | Roedding | 292—126 |
| 2,677,575 | 5/1954 | Phillips | 292—216 X |
| 2,793,061 | 5/1957 | Dall | 292—6 |

FOREIGN PATENTS 643,746   5/1928   France.

RICHARD E. MOORE, *Primary Examiner.*